United States Patent
Chilukuri et al.

(10) Patent No.: US 7,502,972 B1
(45) Date of Patent: Mar. 10, 2009

(54) REDUCING LOG ENTRIES USING HASH KEYS

(75) Inventors: Sampath Kumar Chilukuri, Karnataka (IN); Kalpana Doraisamy, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/049,341

(22) Filed: Mar. 16, 2008

(51) Int. Cl.
*G06F 11/00* (2006.01)
*G06F 11/30* (2006.01)

(52) U.S. Cl. .......................... 714/45; 714/38; 717/128
(58) Field of Classification Search .................... 714/45, 714/38; 717/128
See application file for complete search history.

(56) References Cited

U.S. PATENT DOCUMENTS

| | | | |
|---|---|---|---|
| 6,067,547 A * | 5/2000 | Douceur | 707/100 |
| 6,247,149 B1 | 6/2001 | Falls et al. | |
| 6,553,564 B1 * | 4/2003 | Alexander et al. | 717/128 |
| 6,658,416 B1 * | 12/2003 | Hussain et al. | 707/10 |
| 6,802,067 B1 | 10/2004 | Camp et al. | |
| 2005/0010545 A1 | 1/2005 | Joseph | |
| 2005/0146449 A1 | 7/2005 | Adl-Tabatabai et al. | |
| 2005/0289399 A1 * | 12/2005 | Kimura | 714/45 |
| 2006/0004597 A1 | 1/2006 | Charters et al. | |
| 2006/0168591 A1 | 7/2006 | Hunsinger et al. | |
| 2007/0180333 A1 * | 8/2007 | Thekkath et al. | 714/45 |
| 2008/0141221 A1 * | 6/2008 | Benesovska et al. | 717/124 |

* cited by examiner

*Primary Examiner*—Scott Baderman
*Assistant Examiner*—Joseph Schell
(74) *Attorney, Agent, or Firm*—MaxValueIP, LLC

(57) ABSTRACT

An example of this presentation deals with the way the events emitted from a component can be grouped from the development phase, so that when the problem occurs in the production environment, the problem could be tracked easily and analyzed. The embodiment deals with the program having multiple separate paths for execution. The execution path could be the normal flow of events grouped together (and generating a key to represent the normal flow). The other execution paths could represent the alternate flows, also grouped, and a key is generated to represent which one is deviated from normal flow. The database stores the key and the relative event flow information, which indicates the grouped events. The lookup viewer can be provided for viewing the normal and alternate flows, since the event has been logged as keys. A "Key" is a hash on the static content of the events, which is used to identify a particular start and end of the functionality in a flow of execution.

1 Claim, 2 Drawing Sheets

REDUCING LOG ENTRIES USING HASH KEYS

BACKGROUND OF THE INVENTION

Virtually, every system in the IT infrastructure exposes the activity being carried out by it, using logging. Log files are the primary source of finding out the various aspects of a system. A developer checks the log files to see if the program he or she developed is running as expected. The various flows of execution of a program are inspected by the log records written to the log file by the program. An administrator of a system checks the log files to see the reasons an application is failing to execute as required. Log files provide the administrator with the first-step-information on what is going wrong with the application. Numerous examples could be stated mentioning the scenarios where log files help developers, administrators, or even customers, under various circumstances, such as problem determination.

The log files grow to huge sizes over time and severely hamper the effective usage of them. People and applications that use the log files, for analysis of the activity carried out by the system, find it difficult to search for the necessary sections in the logs due to the sheer size of the logs. Various kinds of applications and tools are available today that are developed primarily with the notion of using log files to help in problem determination, searching of log records, filtering relevant log records, analyze the flow of the program, generate aggregate reports of the log records, and etc.

These applications, however, do not reduce the amount of data that is recorded in the log files, and also, their performance deteriorates with the increase in the size of log files. Thus, it would be beneficial to create a logging mechanism to reduce the size of log files; however, not compromising on the amount of information that is recorded to the log files. The disclosure described helps to reduce the amount of data written to the log files without losing on the information content. Moreover, it helps in easy identification of the failure sections from the log records by keeping a central repository of the log records.

SUMMARY OF THE INVENTION

An embodiment of this invention provides the following steps: to create a hash key from a set of log records that are supposed to be written to the log file (and to write only the hash key, instead of the set of log records). The hash key takes a very small field and takes little storage space, compared to the set of log records, thus, greatly reducing the size of the log files. The set of log records are stored in a centralized repository of log records and are looked up during the analysis of the log information, using the hash key. This could be done through the development of a simple tool. The centralized repository of log records can be prepared at various stages of development lifecycle, like development, testing, etc (and even during support and maintenance).

The log record set that is expected flow and the alternative flows can be easily highlighted differently in the tool that is used to view the complete log information after correlating the hash key with the central repository of log records.

The advantages of this method are:
1) Hashing—reduces the log size record.
2) Grouping—identifying the required log section for easy analysis, e.g. problem determination.
3) Centralized repository for log keys—enhances reuse of log lines and helps in tagging log sections.
4) Reduced I/O operation—log records are grouped and written once to the file, which reduces the I/O operations involved. Thus, it enables tracing for applications.

DETAILED DESCRIPTION OF THE PREFERRED EMBODIMENTS

Figure 1:
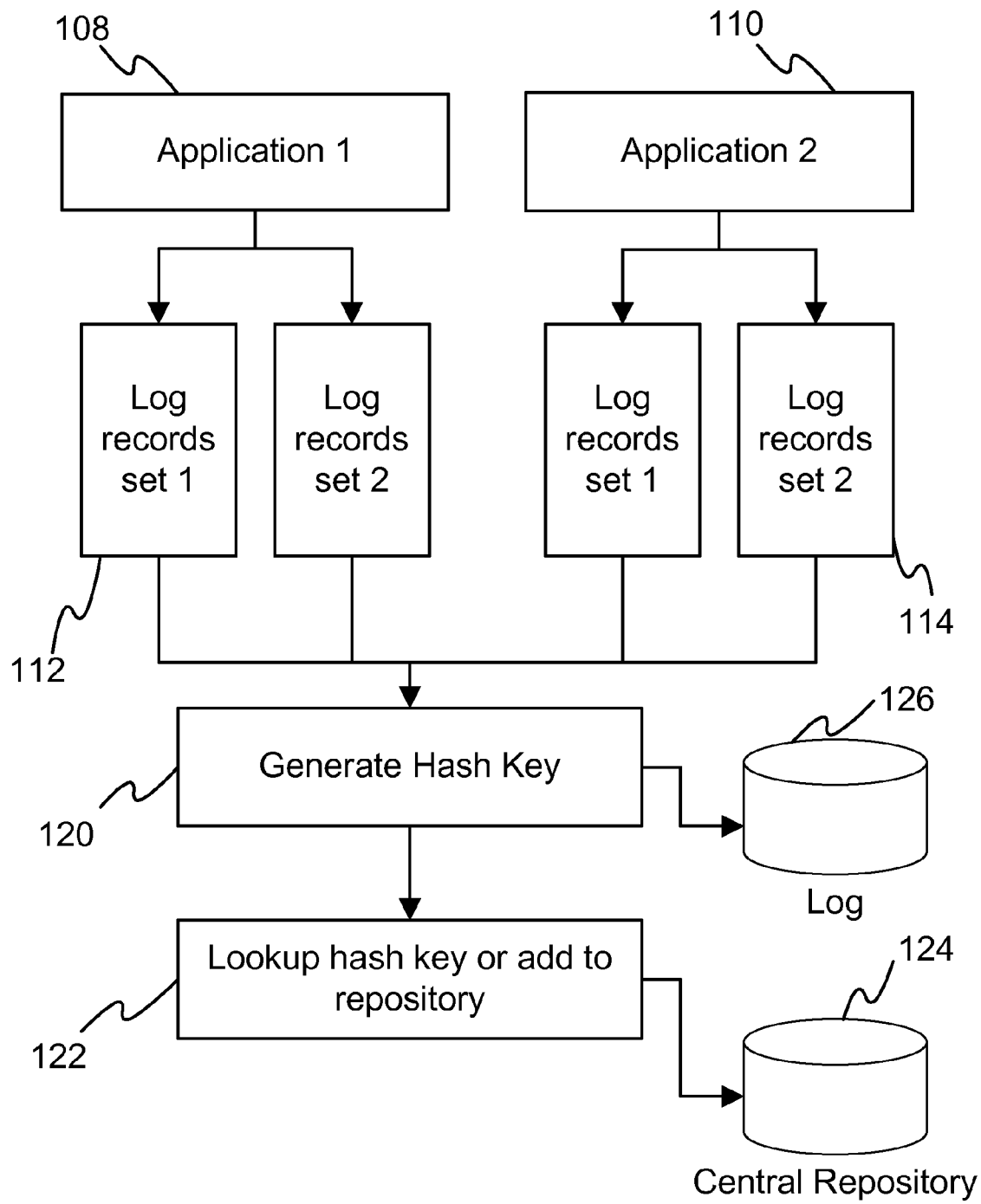
FIG. 1 is a schematic diagram of the logging events with static and dynamic contents in an application.

In an embodiment of the invention, log records are written during the execution of the programs. Developers generally make use of standard logging method in their applications. The simplest example of writing a log record is by calling the log() or trace() method on a Java or C++ class after the initialization of the class. Calling the log() method writes the corresponding parameter passed to the log file. The disclosure described in this document proposes the log records to be held in a vector, forming a set of log records that identify a particular execution flow in a program. This is explained with the help of an example, as shown below:

The typical way of writing flow of program execution as log records is as follows, e.g.:

```
<code segment 1>
log("line 1 to log");
<code segment 2>
log("line 2 to log");
if <condition> then
<code segment 3>
log("line 3 to log");
log("line 4 to log");
else
<code segment 4>
log("line 5 to log");
end if
log("line 6 to log");
```

In an embodiment of the invention, the log lines are written to the log file, and when the log() method is called, results in the log file content (as given below), assuming that the condition is evaluated to be true.

line 1 to log
line 2 to log
line 3 to log
line 4 to log
line 6 to log It is obvious that a lot of information is written that is mainly used to check the flow of the program. For example, occurrence of line 3 after line 2 indicates that the condition evaluated to be true. Similarly, line 6 indicates that the program is continued. In this case, five lines are written to the log file. The method of reducing the log entries written to the log file described in this disclosure requires the log records to be cached in a vector, until a set of log records are prepared (instead of writing them to the log immediately). Hence, all the five lines that are written to the log are now held in a vector by the logging framework. The set of log records that indicate a specific flow of program is given an ID by the logging framework. Hence, the code of logging as per this disclosure is described in the following pseudo-code section.

```
<code segment 1>
id=log.getId ();
log("line 1 to log");
<code segment 2>
```

```
log("line 2 to log");
if <condition> then
<code segment 3>
log("line 3 to log");
log("line 4 to log");
else
<code segment 4>
log("line 5 to log");
end if
log("line 6 to log");
log();
id=log.getId();
log("line 7 to log");
<code segment 5>
log("line 8 to log");
log();
```

In one embodiment, the logging method generates a hash key using any of the popular hashing algorithms once a new ID is requested by the program or when the user calls the log method without any parameters. A request for new ID indicates that the relevant section of the logging is complete and the hash key corresponding to the log records can be generated.

Assume that the ID returned by the framework is X for the first time. The log lines 1, 2, 3, 4, 6 (assuming the condition was true) are added to the vector (maintained by the logging framework, upon the call to "log" method). When the second call to obtain ID is issued by the program, the logging framework generates a hash key using the log lines cached in the vector, and writes the hash key to the log file, instead of the log lines. The next step is to update the repository of log records, with the hash key as the key and the log records from the vector as its content. Then, a new ID is generated, say Y, and returned to the program. This way, the size of log record is always constant and depends on the hashing algorithm employed (and does not depend on the number or size of the log records). With this method, the content of the log record will be as follows:

<hash key 1>
<hash key 2>

Hash key 1 is for the log lines 1, 2, 3, 4, 6 and hash key 2 is for 7, and 8, thus, greatly reducing the amount of logged content, which also enables grouping of log records.

In an embodiment of the invention, the central repository is built as a database that contains the hash key and the corresponding log records. The same repository can be used by multiple users or multiple installations of the logging framework, so that only one instance of hash key is recorded per set of log records, thus, eliminating the duplication of log records by multiple instances of the product, or by multiple users over a network.

When the problem occurred, the user has to just pass the keys, so that it helps the support person to understand the flow of events. Since the hash key and the log events are available in the central repository, the event can be cached. There is no mechanism to group events and generate key to understand the flow of events.

The business values of an embodiment of the invention are:
1. Reducing the log lines written to the logs, by writing only the hash key to the log records, based on the static content.
2. Central repository look-up on hash key generated, so that only the hash key is written to the log file, and log lines are written to central repository only once.
3. API, which a developer can leverage and use it during the development phase, in order to enable better problem determination for the support team.

Referring more particularly to the drawings, FIG. 1 is a schematic diagram of the Logging events with static and dynamic contents in an application. In one embodiment, a given operation, the Application 1, (108) is generating the log events set 1 (112) and generates hash key (120) with the group of log events. The log events are grouped, and the generated hash key is written to log file (126) and central repository (124). Application 2 (110), having the same set of log events like Application 1 (108) log records set 1 (114), generates the same hash key (120) and does a look up in central repository (122). Since the hash key is already available in the central repository, it writes hash key only to the log. Central repository (124) maintains the hash key with the associated log events.

Many of the log events have the mix of static and dynamic information. In such a case, the hash key is built only using the static content of the log line, the dynamic parameters are appended to the end of hash key, and dynamic contents are not used in the hash key generation.

Figure 2:
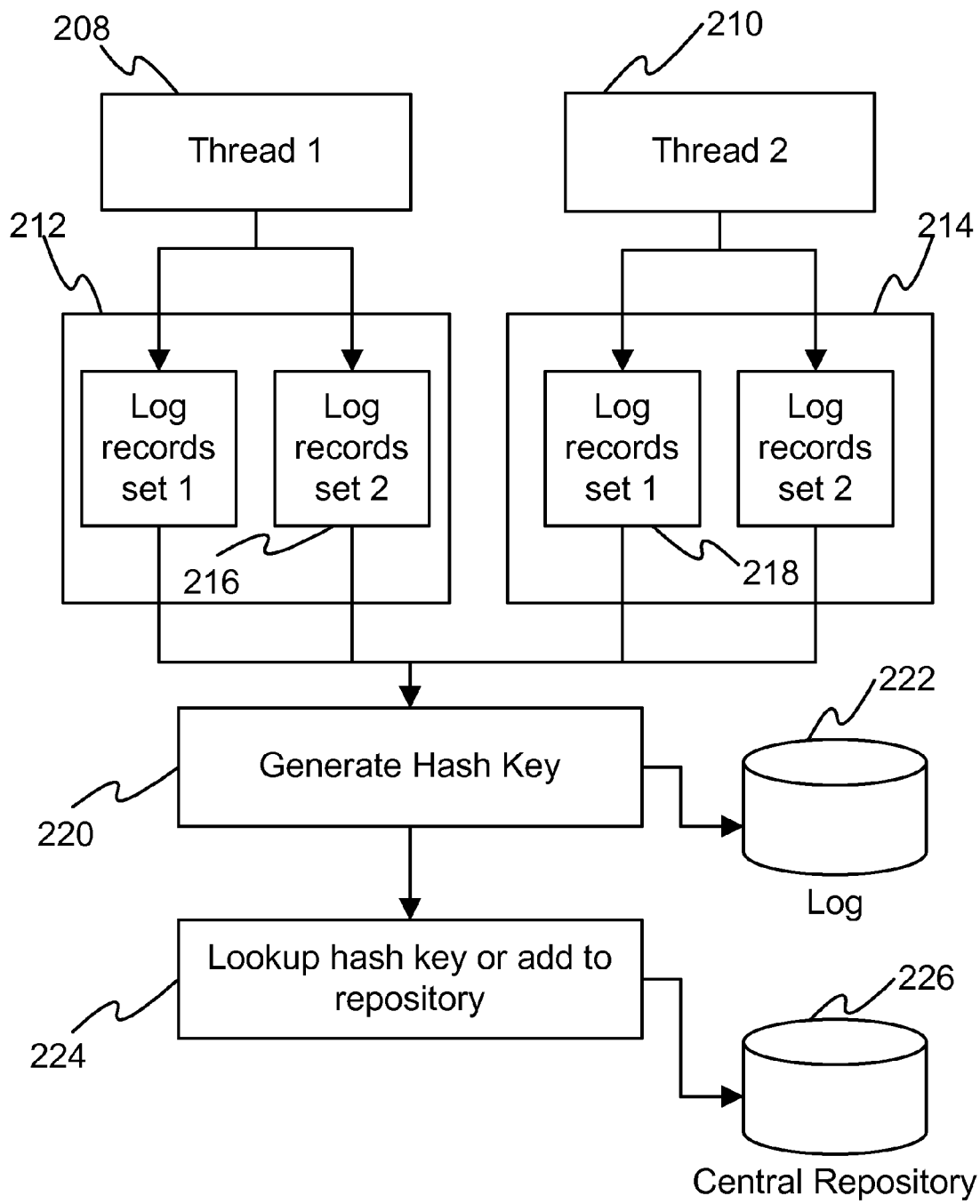
FIG. 2 is a schematic diagram of the logging events with a multi-threaded application.

FIG. 2 is a schematic diagram of the Logging events with Multi-threaded application. In one embodiment, the application uses thread 1 (208) and thread 2 (210). This embodiment maintains separate vector of log records for thread 1 (212) and thread 2 (214), so as to group the log records originating from a particular thread (216), and generates hash key (220) with the group of log events. The log events are grouped, and generated hash key is written to log file (222) and central repository (226). Thread 2 (210), having the same set of log events like Thread 1 (208) log records set 1 (218), generates the same hash key and does a look-up in central repository (224). Since the hash key is already available in the central repository, it writes hash key only to the log. Central repository (226) maintains the hash key with the associated log events.

In one embodiment, we have a method of reducing log entries using hash keys, the method comprising:
generating log files based on running a program developed by a user;
the user checking the log files to see if the program is running as expected, wherein various flows of execution of the program are written to the log files by the program;
grouping related flow of events;
inspecting log records within the log files, to find all errors and problems with the program;
filtering content of the log records;
analyzing flow of the program;
highlighting alternative flows, to examine the log records;
generating aggregate reports, based on the content of the log records;
creating hash keys from the log records; wherein for any log record with dynamic content, the hash keys are based on only static content of log lines within the log files, and the dynamic content is appended at the end of the hash keys;
storing the hash keys in a centralized repository;
reusing the log lines;
tagging log sections within the log files;
tagging the events for updating, before the events are emitted;
grouping the log records;
processing dynamic content in the events;
applying an application programming interface for problem determination;
incorporating the grouped related flow of events, to update the centralized repository;
applying the centralized repository for other users, and for multiple installations of logging framework;

and keeping an additional information in the centralized repository, to speed up a search process for the log files.

A system, apparatus, or device comprising one of the following items is an example of the invention: log entries, logs, hash keys, log files, key generator, log records, central repository, server, client device, PDA, mobile device, cell phone, storage, router, switches, network, communication media, cables, fiber optics, physical layer, buffer, nodes, packet switches, computer monitor, or any display device, applying the method mentioned above, for purpose of hashing, logs, and failure analysis and management.

Any variations of the above teaching are also intended to be covered by this patent application.

The invention claimed is:

1. A method of reducing log entries using hash keys, said method comprising:
   generating log files based on running a program developed by a user;
   said user checking said log files to see if said program is running as expected;
   wherein various flows of execution of said program are written to said log files by said program;
   grouping related flows of events;
   inspecting log records within said log files, to find all errors and problems with said program;
   filtering content of said log records;
   analyzing flow of said program;
   highlighting alternative flows, to examine said log records;
   generating aggregate reports, based on said content of said log records;
   creating hash keys from said log records;
   wherein for any log record with dynamic content, said hash keys are based on only static content of log lines within said log files, and said dynamic content is appended at the end of said hash keys;
   storing said hash keys in a centralized repository;
   reusing said log lines;
   tagging log sections within said log files;
   tagging said events for updating, before said events are emitted;
   grouping said log records;
   processing dynamic content in said events;
   applying an application programming interface for problem determination;
   incorporating said grouped related flows of events, to update said centralized repository;
   applying said centralized repository for other users and for multiple installations of logging framework; and
   keeping an additional information in said centralized repository, to speed up a search process for said log files.

* * * * *